United States Patent
Kulkarni et al.

(10) Patent No.: US 10,095,957 B2
(45) Date of Patent: Oct. 9, 2018

(54) METHOD AND SYSTEM FOR UNSUPERVISED WORD IMAGE CLUSTERING

(71) Applicant: Tata Consultancy Services Limited, Mumbai (IN)

(72) Inventors: Mandar Shrikant Kulkarni, Pune (IN); Anand Sriraman, Pune (IN); Rahul Kumar, Pune (IN); Kanika Kalra, Pune (IN); Shirish Subhash Karande, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/432,715

(22) Filed: Feb. 14, 2017

(65) Prior Publication Data
US 2017/0270387 A1    Sep. 21, 2017

(30) Foreign Application Priority Data
Mar. 15, 2016    (IN) .............................. 201621009008

(51) Int. Cl.
*G06K 9/66* (2006.01)
*G06K 9/32* (2006.01)
(Continued)

(52) U.S. Cl.
CPC .......... *G06K 9/6218* (2013.01); *G06K 9/4604* (2013.01); *G06K 9/6215* (2013.01); *G06K 9/66* (2013.01)

(58) Field of Classification Search
None
See application file for complete search history.

(56) References Cited

U.S. PATENT DOCUMENTS 7,724,957 B2    5/2010    Abdulkader
9,501,724 B1 *  11/2016   Yang .................... G06K 9/6828
(Continued)

FOREIGN PATENT DOCUMENTS

| CN | 104299006 A | 1/2015 |
|---|---|---|
| CN | 104572965 A | 4/2015 |
| WO | WO 2015/157526 A1 | 10/2015 |

*Primary Examiner* — Randolph I Chu
(74) *Attorney, Agent, or Firm* — Finnegan, Henderson, Farabow, Garrett & Dunner LLP (57) ABSTRACT

The present application provides a method and system for unsupervised word image clustering, comprises capturing one or more image wherein the one or more image comprises at least one word images. Extracting at least one feature vector using an untrained convolution neural network architecture, wherein the convolution filters are initialized by random filter based deep learning techniques using Gaussian random variable with zero mean and unit standard deviation, and wherein the convolution filters are constrained to sum to zero. The extracted feature vectors are used for clustering, wherein clustering is performed in two stages. First stage includes clustering word images which are similar using a graph connected component. Second stage clustering includes clustering a remaining word images which are not clustered during the first stage by evaluating the remaining images against the clusters formed during the first stage and assigning them to clusters based on the evaluation.

7 Claims, 4 Drawing Sheets

(51) Int. Cl.
*G06K 9/62* (2006.01)
*G06K 9/46* (2006.01)

(56) References Cited

U.S. PATENT DOCUMENTS

| | | | |
|---|---|---|---|
| 2008/0260256 A1* | 10/2008 | Zeng | G06K 9/3283 382/195 |
| 2013/0060786 A1 | 3/2013 | Serrano et al. | |
| 2017/0011279 A1* | 1/2017 | Soldevila | G06K 9/66 |

* cited by examiner

METHOD AND SYSTEM FOR UNSUPERVISED WORD IMAGE CLUSTERING

PRIORITY CLAIM

This U.S. patent application claims priority under 35 U.S.C. § 119 to: India Application No. 201621009008, filed on 15 Mar. 2016. The entire contents of the aforementioned application are incorporated herein by reference.

TECHNICAL FIELD

The present application generally relates to machine learning. Particularly, the application provides a method and system for unsupervised word image clustering.

BACKGROUND

In countries like India, several government, bank, real estate etc. related transactions take place on paper. There is a strong recent initiative to reduce paper based transaction, however digitization of archival data remains a big challenge for achieving this goal. Robust character segmentation is a challenge for many Indic scripts, and hence the accuracies of Optical Character Recognition (OCR) remain poor.

Robust character segmentation is a challenge for many Indic scripts, and hence the accuracies of Optical Character Recognition (OCR) remain poor. An OCR engines fail on Indian scripts mainly because character segmentation is non-trivial. Segmenting words from scripts is relatively easier and thus creation of a word level dataset provides a viable alternative. This data can help applications such as indexing, transcription, OCR etc.

Feature based word clustering is an alternative that is employed for word recognition. Further randomly initialized deep networks work well for object recognition. However the randomly initialized deep network are not fine-tuned for shape feature extraction.

Although supervised feature based word clustering, which is the method that is currently employed for word clustering is ava however, this method requires large amount of training data, computing resources and takes long time for training.

SUMMARY

Embodiments of the present disclosure present technological improvements as solutions to one or more of the above-mentioned technical problems recognized by the inventors in conventional systems. For example, in one embodiment, the present application provides a computer implemented method for unsupervised word image clustering, wherein said method comprises, capturing one or more image using at least one image capture device (200). In one embodiment at least one of the one or more image comprises at least one word image. The method further comprises extracting one or more feature vector for each of the at least one word image using an untrained convolution neural network architecture, wherein extraction comprises, applying, by a convolution module (210), a first convolution to the at least one input image using a first plurality of filters, wherein the first plurality of filters are initialized by random filter based deep learning techniques using Gaussian random variable with zero mean and unit standard deviation, and wherein the plurality of filters are constrained to sum to zero. The method further comprises, applying, by the convolution module (210) a Rectified Linear Unit (ReLU) non-linearity to a first plurality of feature maps. In an embodiment, the first plurality of feature maps is generated as output of the first convolution. Further the method comprises applying, by a sub-sampling module (212) a first sub-sampling to increase the position invariance of the first plurality of feature maps, wherein sub-sampling comprises applying a pooling operation on non-overlapping segments of the first plurality of feature maps after application of the ReLU non-linearity; applying, by the convolution module (210), a second convolution on the output of the first sub-sampling using a second plurality of filters wherein the second plurality of filters are initialized by random filter based deep learning techniques using Gaussian random variable with zero mean and unit standard deviation, and wherein the plurality of filters are constrained to sum to zero. Further the method comprises, applying, by the convolution module (210), a Rectified Linear Unit (ReLU) non-linearity to a second plurality of feature maps, wherein the second plurality of feature maps are generated as output of the second convolution. The method further comprises applying, by the sub-sampling module (212), a second sub-sampling to increase the position invariance of the second plurality of feature maps, wherein sub-sampling comprises applying a pooling operation on non-overlapping segments of the second plurality of feature maps after application of the ReLU non linearity. The method further comprises, combining, by a combination module (214), the plurality of feature maps generated at the output of the second subsampling for extracting one or more feature vector. Finally, a graph clustering module (216), clusters the one or more word images, wherein clustering is based on the one or more feature vector.

In another embodiment, The present application provides a system (102) for unsupervised word image clustering; said system (102) comprising at least one image capture device (200) operatively coupled to the system (102), a processor (202), an interface (204), and memory (206) comprising thereon instructions to: capture one or more image using at least one image capture device (200), wherein at least one of the one or more image comprises at least one word image, extract one or more feature vector for each of the at least one word image using an untrained convolution neural network architecture. In an embodiment, extraction is performed by a convolution module (210), configured to apply, a first convolution to the at least one input image using a first plurality of filters, wherein the first plurality of filters are initialized by random filter based deep learning techniques using Gaussian random variable with zero mean and unit standard deviation, and wherein the plurality of filters are constrained to sum to zero. In another embodiment, the convolution module (210), is further configured to apply, a Rectified Linear Unit (ReLU) non-linearity to a first plurality of feature maps, wherein the first plurality of feature maps is generated as output of the first convolution. Feature extraction further comprises, a sub-sampling module (212), configured to apply, a first sub-sampling to increase the position invariance of the first plurality of feature maps, wherein sub-sampling comprises applying a pooling operation on non-overlapping segments of the first plurality of feature maps after application of the ReLU non-linearity. In yet another embodiment, the convolution module (210) is further configured to apply, a second convolution on the output of the first sub-sampling using a second plurality of filters wherein the second plurality of filters are initialized by random filter based deep learning techniques using Gaussian random variable with zero mean and unit standard deviation, and wherein the plurality of filters are constrained to sum to zero. In another aspect the convolution module (210) is further configured to apply, a Rectified Linear Unit (ReLU) non-linearity to a second plurality of feature maps, wherein the second plurality of feature maps are generated as output of the second convolution.

In yet another embodiment, the sub-sampling module (212), further configured to apply, a second sub-sampling to increase the position invariance of the second plurality of feature maps, wherein sub-sampling comprises applying a pooling operation on non-overlapping segments of the second plurality of feature maps after application of the ReLU non linearity, and a combination module (214), configured to combine, the plurality of feature maps generated at the output of the second subsampling for extracting one or more feature vector. The system finally clusters, the one or more word images using a graph clustering module (216), wherein clustering is based on the one or more feature vector.

In yet another embodiment, a non-transitory computer readable medium is disclosed. The non-transitory computer readable medium stores instructions which when executed by a possessor on a system, cause the processor to perform method for unsupervised word image clustering comprising capturing one or more image using at least one image capture device (200). In one embodiment at least one of the one or more image comprises at least one word image. The method further comprises extracting one or more feature vector for each of the at least one word image using an untrained convolution neural network architecture, wherein extraction comprises, applying, by a convolution module (210), a first convolution to the at least one input image using a first plurality of filters, wherein the first plurality of filters are initialized by random filter based deep learning techniques using Gaussian random variable with zero mean and unit standard deviation, and wherein the plurality of filters are constrained to sum to zero. The method further comprises, applying, by the convolution module (210) a Rectified Linear Unit (ReLU) non-linearity to a first plurality of feature maps. In an embodiment, the first plurality of feature maps is generated as output of the first convolution. Further the method comprises applying, by a sub-sampling module (212) a first sub-sampling to increase the position invariance of the first plurality of feature maps, wherein sub-sampling comprises applying a pooling operation on non-overlapping segments of the first plurality of feature maps after application of the ReLU non-linearity; applying, by the convolution module (210), a second convolution on the output of the first sub-sampling using a second plurality of filters wherein the second plurality of filters are initialized by random filter based deep learning techniques using Gaussian random variable with zero mean and unit standard deviation, and wherein the plurality of filters are constrained to sum to zero. Further the method comprises, applying, by the convolution module (210), a Rectified Linear Unit (ReLU) non-linearity to a second plurality of feature maps, wherein the second plurality of feature maps are generated as output of the second convolution. The method further comprises applying, by the sub-sampling module (212), a second sub-sampling to increase the position invariance of the second plurality of feature maps, wherein sub-sampling comprises applying a pooling operation on non-overlapping segments of the second plurality of feature maps after application of the ReLU non linearity. The method further comprises, combining, by a combination module (214), the plurality of feature maps generated at the output of the second subsampling for extracting one or more feature vector. Finally, a graph clustering module (216), clusters the one or more word images, wherein clustering is based on the one or more feature vector.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
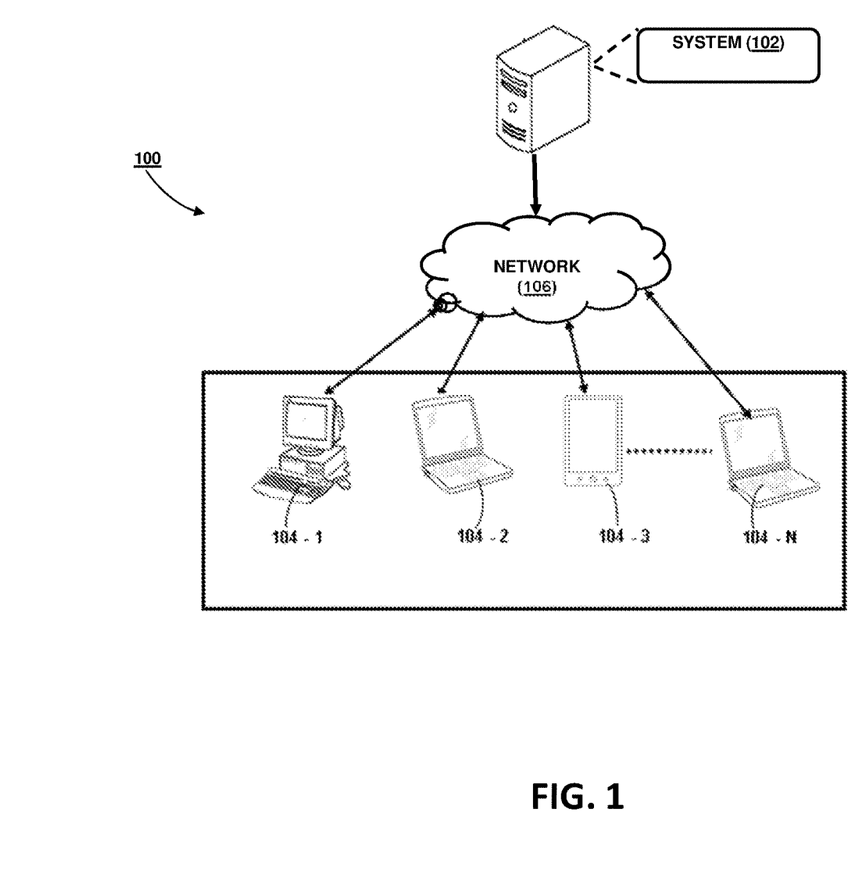
FIG. 1 shows a network implementation (100) of a system (102) for unsupervised word image clustering in accordance with an embodiment of the disclosed subject matter.

Referring to FIG. 1, a network implementation 100 of a system 102 for unsupervised word image clustering is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
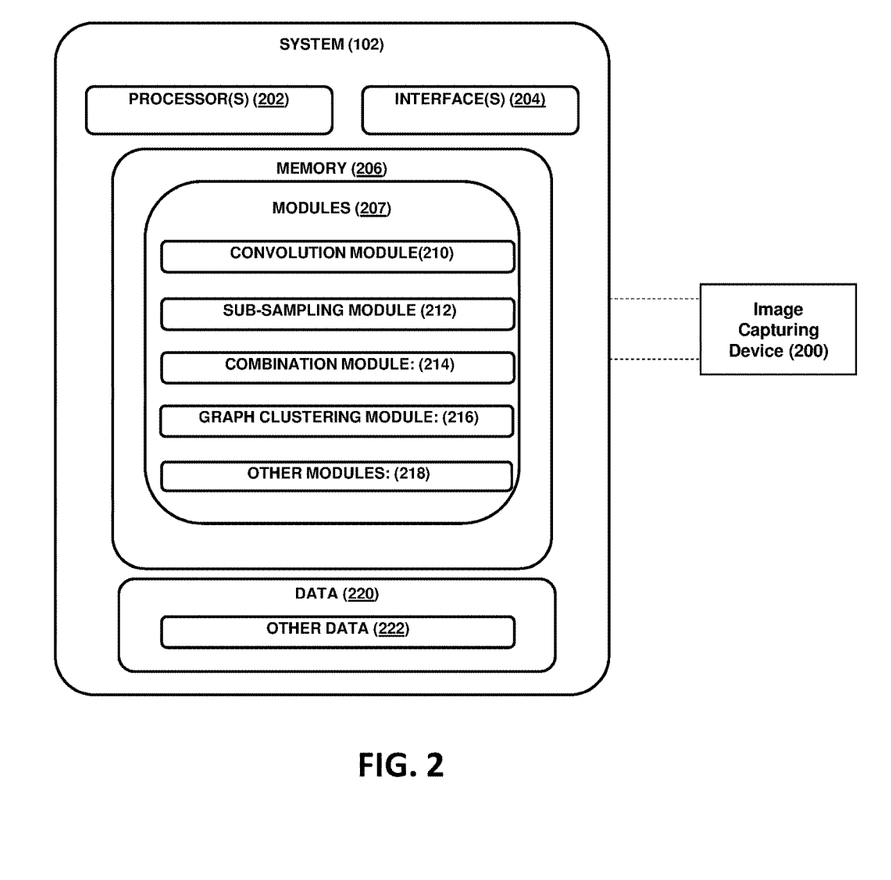
FIG. 2 shows a block diagram illustrating the system (102) for unsupervised word image clustering in accordance with an embodiment of the disclosed subject matter.

In one embodiment of the invention, referring to FIG. 2 block diagram illustrating a system (102) for unsupervised word image clustering is disclosed. The system (102) comprises at least one image capture device (200) which is configured to capture one or more image. In an embodiment, at least one of the one or more image comprises at least one word image. The system (102) further comprises a convolution module (210) which is configured to apply, convolution on the at least one input image using a first plurality of filters. In an embodiment, the first plurality of filters are initialized by random filter based deep learning techniques. In an aspect of the present invention, Gaussian random variable are used with zero mean and unit standard deviation for initialization of filters. Further, the first plurality of filters are constrained to sum to zero which allows inherent of edge features from the one or more images. In an aspect, the convolution filters may be constrained to sum to zero as per equation (1).

$$f = f - \frac{\sum_{m=1}^{M} \sum_{n=1}^{N} f}{M*N} \tag{1}$$

Referring to equation (1), f denotes a random convolution filter, M and N denotes width and height of the filter respectively.

In an embodiment, the output of the convolution module (210) after application of a first convolution comprises a set first plurality of feature maps. In an embodiment the convolution module (210), further configured to apply, a Rectified Linear Unit (ReLU) non-linearity to the first plurality of feature maps as per equation (2).

$$Wi = Ri \max(0, Fi) \tag{2}$$

Referring to equation (2), $F_i$ denotes ith feature map and $R_i$ denotes gain coefficient associated with it. In one aspect, Gain coefficients are chosen from a uniform random variable in the range (0,1).

The system (102) further comprises a sub-sampling module (212). In one aspect of the disclosed invention, the sub-sampling module (212) is configured to apply a first sub-sampling to increase the position invariance of the first plurality of feature maps. Sub-sampling comprises applying a pooling operation on non-overlapping segments of the first plurality of feature maps after application of the ReLU non-linearity by the convolution module (212). In an embodiment A block of k×k is replaced by its average or max value which in turn reduces the dimension of the first plurality of feature maps.

In an embodiment the convolution module (210) may further be configured to apply a second convolution on the output of the first sub-sampling using a second plurality of filters. In an embodiment, the second plurality of filters are initialized by random filter based deep learning techniques. In an aspect of the present invention, Gaussian random variable are used with zero mean and unit standard deviation for initialization of filters. Further, the second plurality of filters are constrained to sum to zero which allows inherent of edge features from the one or more images. In an embodiment, the output of the convolution module (210) after application of a first convolution comprises a set first plurality of feature maps. In an embodiment the convolution module (210), further configured to apply, a Rectified Linear Unit (ReLU) non-linearity to the first plurality of feature maps as per equation (1).

Further the sub-sampling module (212) is configured to apply, a second sub-sampling. Sub-sampling is applied to increase the position invariance of the second plurality of feature maps. In an embodiment sub-sampling comprises applying a pooling operation on non-overlapping segments of the second plurality of feature maps after application of the ReLU non linearity.). In an embodiment A block of k×k is replaced by its average or max value which in turn reduces the dimension of the first plurality of feature maps.

The system (102) further comprises a combination module configured to combine, the plurality of feature maps generated at the output of the second subsampling for extracting one or more feature vector. In an embodiment the one or more feature vector is normalized to have a zero mean and unit norm.

Further the system (102) comprises a graph clustering module (216) configured to cluster the one or more word images based on the extracted one or more feature vector. In an embodiment clustering comprises of two stages. In a first stage, similar word images are clustered using graph connected component, wherein similarity is determined based on the one or more feature vector, extracted corresponding to each of the one or more word image. In a second stage, reaming word images which are not clustered during the first stage are evaluated against formed clusters and assigned to a cluster based on the evaluation.

In one embodiment, during the first stage a normalized cross correlation similarity graph G is generated on the word features as per equation (3).

$$G = U^T U \tag{3}$$

Referring to equation (3), U denotes the feature vector matrix where features are combined as columns. In an embodiment, the dimension of U is d×n where d denotes the dimension of the feature vector and n denotes the number of words in the dataset. Further, an adjacency matrix A is obtained by thresholding G with a pre-defined threshold as per equation (4).

$$A(i,j) = 1 \text{ such that}, G(i,j) \geq \tau_{strong} \tag{4}$$

Referring to equation (4), $\tau_{strong}$ indicates a first similarity threshold value used. Values less than the $\tau_{strong}$ are set to zero. Further, graph connected component analysis is applied on A to find strongly connected points in the data.

Advantages of this method is that it computes the number of clusters automatically and it is computationally efficient. In an embodiment, in order to tackle noise in the data and to avoid errors in the initial clusters, $\tau_{strong}$ is set to a high value. Thereafter, patterns with strong similarity are chosen in the process. The clusters generated are then used as a reference to carry out assignment for the remaining word images.

In the second stage, a mean vector for each cluster obtained in the first stage is calculated. In an embodiment, horizontal and vertical linear shifts are applied, to each individual feature map of the mean vector. Therefore, from each cluster mean, multiple feature vectors are obtained which are shifted versions of each other.

In an aspect, the evaluation of similarity of remaining word images with clustered word images (clusters) is calculated as per equation (5)

$$Y_{m \times p} = X^T_{m \times d} V_{d \times p} \quad (5)$$

Referring to equation (5), X denotes the set of feature vectors obtained with transformations of the mean vectors while every column of V corresponds to the feature vector of an unassigned word image. The dimension of X is d×m where d indicates dimension of the feature vector and m indicates the number of vectors obtained after transformations of the mean vectors. The dimension of V is d×p where p indicates the number of unassigned points. The assignment of a test point is found by maximizing the similarity value across the clusters.

In an embodiment, a refuse-to-predict analysis is used and a word image is assigned to a cluster if the similarity exceeds a pre-defined threshold as per equation (6).

$$C(j) = \arg\max_i Y(i, j) \text{ if } \max_i Y(i, j) >= \tau_{soft} \quad (6)$$

Referring to equation (6), Y(i,j) denotes the similarity of a $j^{th}$ test point with $i^{th}$ training point. C(j) indicates the cluster label assigned to the $j^{th}$ test point. $\tau_{soft}$ indicates a second similarity threshold used for cluster assignment. The value of $\tau_{soft}$ is set relatively lower as compared to $\tau_{strong}$.

Figure 3:
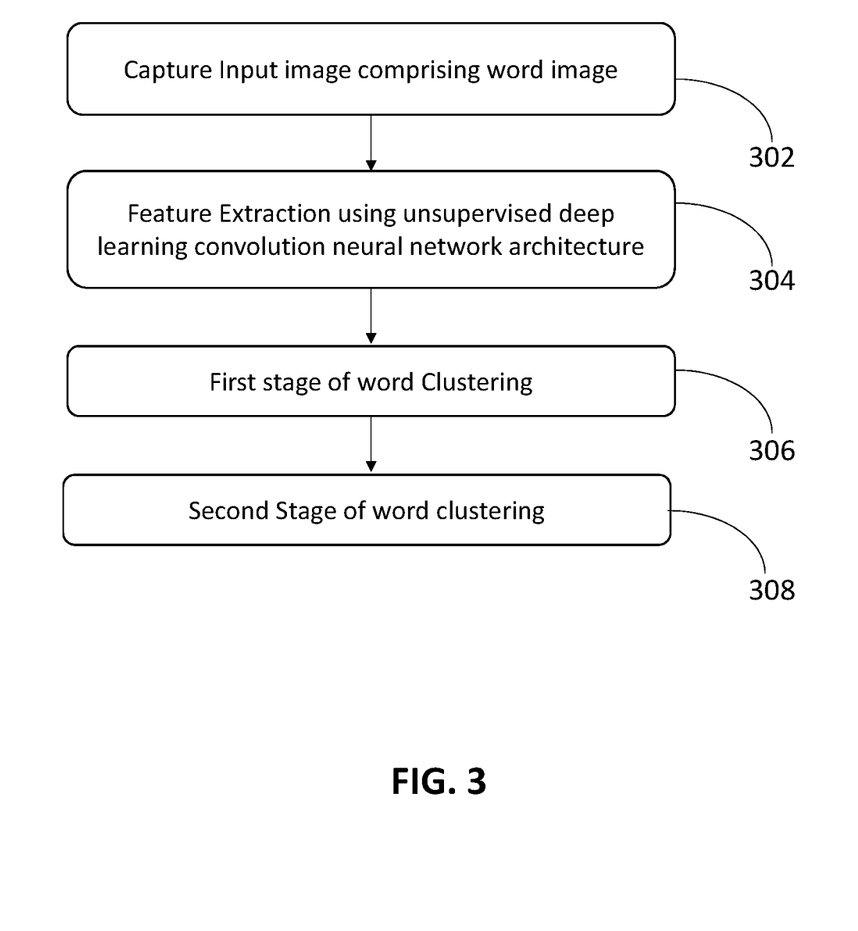
FIG. 3 shows a flow chart illustrating steps for unsupervised word image clustering in accordance with an embodiment of the disclosed subject matter.

Referring now to FIG. 3 a flow chart illustrating steps for unsupervised word image clustering in accordance with an embodiment of the disclosed subject matter is shown. The process starts at step 302, where one or more image is captured using at least one image capture device (200), wherein at least one of the one or more image comprises at least one word image. At the step 304, one or more feature vector are extracted, for each of the at least one word image, using an untrained convolution neural network architecture. The steps for extraction of one or more feature vectors are will be explained in detail in the following paragraphs. At the step 306 a first stage clustering is performed. In an embodiment, the first stage clustering comprises clustering word images which are similar using a graph connected component analysis, wherein similarity is determined based on the extracted feature vector. At the step 308 a second stage clustering is performed. In an embodiment the second stage clustering comprises clustering a remaining word images which are not clustered during the first stage by evaluating the remaining images against the clusters formed during the first stage and assigning the remaining word images to the clusters based on the evaluation by using a refuse to predict analysis.

Figure 4:
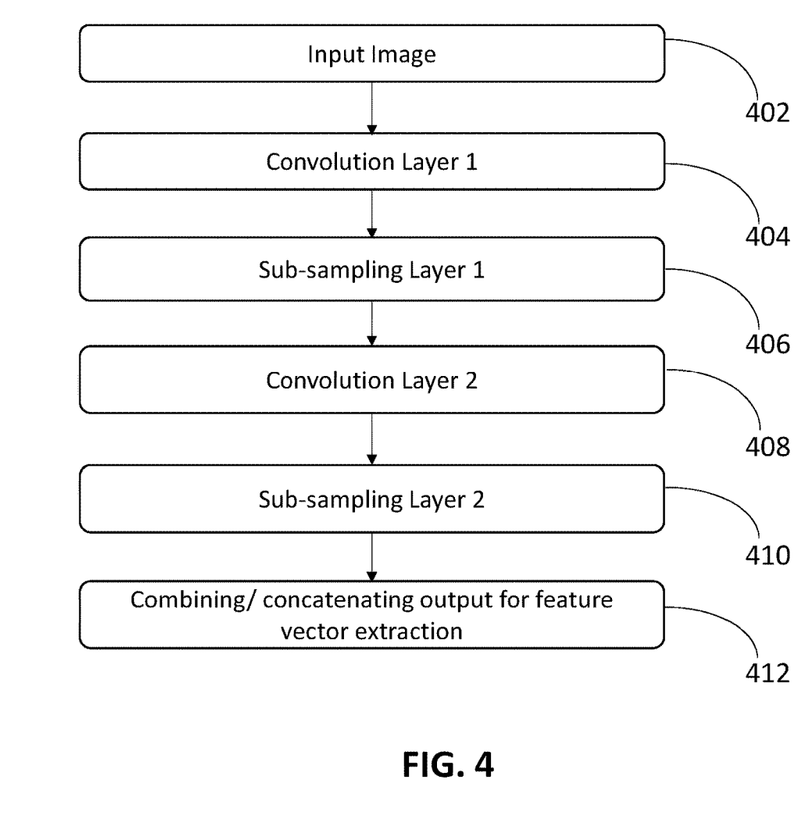
FIG. 4 shows a flowchart illustrating steps for unsupervised word image clustering based word image clustering in accordance with an embodiment of the disclosed subject matter.

Referring now to FIG. 4 a flowchart illustrating steps for feature extraction during unsupervised word image clustering in accordance with an embodiment of the disclosed subject matter is shown. The process starts at step 402 wherein at least one input image is provided to the system for word image clustering.

At the step 404, a first convolution is applied, by a convolution module (210), to the at least one input image using a first plurality of filters. In an embodiment the first plurality of filters are initialized by random filter based deep learning techniques using Gaussian random variable with zero mean and unit standard deviation. In another embodiment the plurality of filters are constrained to sum to zero. Further in an embodiment a Rectified Linear Unit (ReLU) non-linearity is applied to a first plurality of feature maps, wherein the first plurality of feature maps is generated as output of the first convolution.

At the step 406, a first sub-sampling is applied, by a sub-sampling module (212), wherein the sub-sampling increases the position invariance of the first plurality of feature maps. In an embodiment sub-sampling comprises applying a pooling operation on non-overlapping segments of the first plurality of feature maps after application of the ReLU non-linearity.

At the step 408, a second convolution is applied, by the convolution module (210), on the output of the first sub-sampling using a second plurality of filters. In an embodiment the second plurality of filters are initialized by random filter based deep learning techniques using Gaussian random variable with zero mean and unit standard deviation. In another embodiment the plurality of filters are constrained to sum to zero. Further in yet another embodiment a Rectified Linear Unit (ReLU) non-linearity is applied to a second plurality of feature maps, wherein the second plurality of feature maps is generated as output of the second convolution.

At the step 410, a second sub-sampling is applied, by the sub-sampling module (212), wherein sub-sampling increases the position invariance of the second plurality of feature maps. In an embodiment, sub-sampling comprises applying a pooling operation on non-overlapping segments of the second plurality of feature maps after application of the ReLU non linearity.

At the step 412, the plurality of feature maps generated at the output of the second subsampling are combined by a combination module (214), for extracting one or more feature vector.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for unsupervised word image clustering, said method comprising processor implemented steps of:
    capturing one or more image using at least one image capture device, wherein at least one of the one or more image comprises at least one word image;
    extracting one or more feature vector for each of the at least one word image using an untrained convolution neural network architecture, wherein extraction comprises:
        applying a first convolution to the at least one input image using a first plurality of filters, wherein the first plurality of filters are initialized by random filter based deep learning techniques using Gaussian random variable with zero mean and unit standard deviation, and wherein the plurality of filters are constrained to sum to zero;
        applying a Rectified Linear Unit (ReLU) non-linearity to a first plurality of feature maps, wherein the first plurality of feature maps is generated as output of the first convolution;
        applying a first sub-sampling to increase the position invariance of the first plurality of feature maps, wherein sub-sampling comprises applying a pooling operation on non-overlapping segments of the first plurality of feature maps after application of the ReLU non-linearity;
        applying a second convolution on the output of the first sub-sampling using a second plurality of filters wherein the second plurality of filters are initialized by random filter based deep learning techniques using Gaussian random variable with zero mean and unit standard deviation, and wherein the plurality of filters are constrained to sum to zero;
        applying a Rectified Linear Unit (ReLU) non-linearity to a second plurality of feature maps, wherein the second plurality of feature maps are generated as output of the second convolution;
        applying a second sub-sampling of the second plurality of feature maps, wherein sub-sampling comprises applying a pooling operation on non-overlapping segments of the second plurality of feature maps after application of the ReLU non linearity; and
        combining the plurality of feature maps generated at the output of the second subsampling for extracting one or more feature vector; and
    clustering the one or more word images based on the one or more feature vector, wherein the clustering comprises:
        clustering word images based on a similarity value across a first stage cluster, wherein the similarity value is evaluated by comparing the extracted one or more feature vector with a pre-defined first similarity threshold value (Tstrong) and
        clustering word images based on a similarity value across a second stage cluster, wherein the similarity value is evaluated by comparing the extracted one or more feature vector with a pre-defined second similarity threshold value (Tsoft),
        wherein the first similarity threshold value (Tstrong) is higher than the second similarity threshold value (Tsoft),
        wherein the clustered word images are used for performing one or more functions, wherein the one or more functions comprises indexing, transcription, and optical character recognition.

2. The method according to claim 1, wherein the extracted one or more feature vector is normalized such that the one or more feature vector has a zero mean and a unit norm.

3. The method according to claim 1, wherein
    the first stage cluster comprises clustering word images which are similar using a graph connected component analysis, wherein similarity is determined based on the extracted feature vector; and
    the second stage cluster comprises clustering a remaining word images which are not clustered during the first stage by evaluating the remaining images against the clusters formed during the first stage and assigning the remaining word images to the clusters based on the evaluation by using a refuse to predict analysis.

4. A system for unsupervised word image clustering said system comprising
    at least one image capture device operatively coupled to the system,
    a processor, an interface, and memory, wherein the memory, store instructions for execution by the processors to:
    capture one or more image using at least one image capture device, wherein at least one of the one or more image comprises at least one word image;
    extract one or more feature vector for each of the at least one word image using an untrained convolution neural network architecture, wherein extraction is performed by:
        a first convolution to the at least one input image using a first plurality of filters, wherein the first plurality of filters are initialized by random filter based deep learning techniques using Gaussian random variable with zero mean and unit standard deviation, and wherein the plurality of filters are constrained to sum to zero;
        apply a Rectified Linear Unit (ReLU) non-linearity to a first plurality of feature maps, wherein the first plurality of feature maps is generated as output of the first convolution;
        apply a first sub-sampling to increase the position invariance of the first plurality of feature maps, wherein sub-sampling comprises applying a pooling operation on non overlapping segments of the first plurality of feature maps after application of the ReLU non-linearity;
        apply a second convolution on the output of the first sub-sampling using a second plurality of filters wherein the second plurality of filters are initialized by random filter based deep learning techniques using Gaussian random variable with zero mean and unit standard deviation, and wherein the plurality of filters are constrained to sum to zero;
        apply a Rectified Linear Unit (ReLU) non-linearity to a second plurality of feature maps, wherein the second plurality of feature maps are generated as output of the second convolution;
        apply a second sub-sampling to increase the position invariance of the second plurality of feature maps, wherein sub-sampling comprises applying a pooling operation on non-overlapping segments of the second plurality of feature maps after application of the ReLU non linearity; and combine the plurality of feature maps generated at the output of the second sub sampling for extracting one or more feature vector; and cluster, the one or more word images, wherein clustering is based on the one or more feature vector, the clustering comprises:

clustering word images based on a similarity value across a first stage cluster, wherein the similarity value is evaluated by comparing the extracted one or more feature vector with a pre-defined first similarity threshold value (Tstrong); and clustering word images based on a similarity value across a second stage cluster, wherein the similarity value is evaluated by comparing the extracted one or more feature vector with a pre-defined second similarity threshold value (Tsoft), wherein the first similarity threshold value (Tstrong) is higher than the second similarity threshold value (Tsoft), wherein the clustered word images are used for performing one or more functions, wherein the one or more functions comprises indexing, transcription, and optical character recognition.

5. The system according to claim 4, wherein the system is further configured to normalize the one or more extracted feature vector such that the one or more feature vector has a zero mean and a unit norm.

6. The system according to claim 4, wherein the first stage clustering comprises clustering word images which are similar using a graph connected component analysis, wherein similarity is determined based on the extracted feature vector; and the second stage clustering comprises clustering remaining word images which are not clustered during the first stage by evaluating the remaining images against the clusters formed during the first stage and assigning the remaining word images to the clusters based on the evaluation.

7. A non-transitory computer readable medium storing instructions which when executed by a possessor on a system cause the processor to perform method for unsupervised word image clustering comprising:

capturing one or more image using at least one image capture device, wherein at least one of the one or more image comprises at least one word image;

extracting one or more feature vector for each of the at least one word image using an untrained convolution neural network architecture, wherein extraction comprises:

applying a first convolution to the at least one input image using a first plurality of filters, wherein the first plurality of filters are initialized by random filter based deep learning techniques using Gaussian random variable with zero mean and unit standard deviation, and wherein the plurality of filters are constrained to sum to zero, applying a Rectified Linear Unit (ReLU) non-linearity to a first plurality of feature maps, wherein the first plurality of feature maps is generated as output of the first convolution, applying a first sub-sampling to increase the position invariance of the first plurality of feature maps, wherein sub-sampling comprises applying a pooling operation on non overlapping segments of the first plurality of feature maps after application of the ReLU non-linearity, applying a second convolution on the output of the first sub-sampling using a second plurality of filters wherein the second plurality of filters are initialized by random filter based deep learning techniques using Gaussian random variable with zero mean and unit standard deviation, and wherein the plurality of filters are constrained to sum to zero, applying a Rectified Linear Unit (ReLU) non-linearity to a second plurality of feature maps, wherein the second plurality of feature maps are generated as output of the second convolution, applying a second sub-sampling to increase the position invariance of the second plurality of feature maps, wherein sub-sampling comprises applying a pooling operation on non-overlapping segments of the second plurality of feature maps after application of the ReLU non linearity, and combining the plurality of feature maps generated at the output of the second subsampling for extracting one or more feature vector; and clustering the one or more word images is based on the one or more feature vector, wherein the clustering comprises:

clustering word images based on a similarity value across a first stage cluster, wherein the similarity value is evaluated by comparing the extracted one or more feature vector with a pre-defined first similarity threshold value (Tstrong);

clustering word images based on a similarity value across a second stage cluster, wherein the similarity value is evaluated by comparing the extracted one or more feature vector, with a pre-defined second similarity threshold value (Tsoft); and wherein the first similarity threshold value (Tstrong) is higher than the second similarity threshold value (Tsoft), wherein the clustered word images are used for performing one or more functions, wherein the one or more functions comprises indexing, transcription, and optical character recognition.

* * * * *